United States Patent [19]
Ueno et al.

[11] Patent Number: 5,892,565
[45] Date of Patent: Apr. 6, 1999

[54] PROGRESSIVE MULTIFOCAL LENS

[75] Inventors: Yasunori Ueno, Kawasaki; Mitsuhiro Yanari, Ichikawa; Fumio Takahashi, Ibaraki-ken, all of Japan

[73] Assignee: Nikon Corporation, Tokyo, Japan

[21] Appl. No.: 954,662

[22] Filed: Oct. 20, 1997

[30] Foreign Application Priority Data

Oct. 18, 1996 [JP] Japan .................................. 8-297654
Oct. 18, 1996 [JP] Japan .................................. 8-297655
Oct. 18, 1996 [JP] Japan .................................. 8-297658

[51] Int. Cl.$^6$ .................................................. G02C 7/06
[52] U.S. Cl. .................................................. 351/169
[58] Field of Search .................................. 351/168, 169, 351/170, 171, 172

[56] References Cited

U.S. PATENT DOCUMENTS

| | | | |
|---|---|---|---|
| 4,762,408 | 8/1988 | Shinohara | 351/169 |
| 4,786,160 | 11/1988 | Furter | 351/169 |
| 4,796,988 | 1/1989 | Dufour et al. | 351/169 |
| 4,854,689 | 8/1989 | Dufour et al. | 351/169 |

Primary Examiner—Scott J. Sugarman
Attorney, Agent, or Firm—Michael N. Meller

[57] ABSTRACT

A progressive multifocal lens is provided with a near part N, a defined vision part F, and an intermediate part P along the main meridian curve MM'. The near center B of the lens is separated from near eyepoint E by a distance of substantially 2 mm to 8 mm in the lower part along the main meridian curve. The refractive power $K_E$ at the near eyepoint, refractive power $K_A$ at the defined center A, and refractive power $K_B$ at the near center B satisfy the condition:

$$0.6<(K_E-K_A)/(K_B-K_A)<0.9.$$

29 Claims, 9 Drawing Sheets

PROGRESSIVE MULTIFOCAL LENS

The present invention relates to a multifocal lens. More particularly, the present invention relates to a progressive multifocal lens used to assist the accommodation ability of the eye.

Single vision lenses, bifocal lenses, and progressive multifocal lenses are used to correct presbyopia. Of these types of lenses, progressive multifocal lenses in particular do not require a person to change eyeglasses or to put eyeglasses on and off when looking at something nearby or something distant. Also, with regard to appearance, progressive multifocal lenses do not have the lines in glasses that are associated with bifocal lenses. Therefore there is a rather high demand for progressive multifocal lenses.

BACKGROUND OF THE INVENTION

Progressive multifocal lenses are spectacle lenses which assist a person's vision when the eye's accommodation ability weakens and seeing nearby objects becomes difficult. In general, progressive multifocal lenses are provided with a distance vision correction zone (hereinafter "distance part") located in the upper portion of the spectacle lens when being worn; a near vision correction zone (hereinafter "near part") in the lower portion; and a progressive zone (hereinafter "intermediate part") between these two zones where the refractive power changes progressively or continuously. Furthermore, in the apparatus incorporating the principles of the present invention, "upper part," "lower part," "horizontal," "vertical," etc. indicate positional relationships when the spectacle lenses are being worn by an individual person. The difference between the refractive power for near vision and the distance vision is called the addition.

In general, if a wide clear vision zone (astigmatic difference in the range of 0.5 diopters or less) is ensured in the distance part and in the near part of a progressive multifocal lens, and they are linked by a progressive zone (progressive corridor), lens aberration is concentrated in the side zones of this progressive band. As a result, imaging failure (blurred image) and image distortion occur in the side zones of the progressive corridor. Also, when the line of sight moves to a side zone, the eyeglass wearer becomes aware of image distortion and image swim and image blurring which leads to an uncomfortable and negative feeling when wearing the eyeglasses.

In order to resolve these vision characteristics problems, known progressive multifocal lenses have been designed and evaluated based on various perspectives. For the shape of the lens surface, the intersection (main meridian) of a cross-section along a meridian running vertically through substantially the center of the lens surface from the upper part to the lower part with the lens surface object side is used as a reference line for establishing the specifications of the lens addition, etc., and is also used as an important reference line in lens design.

Progressive multifocal lenses with the near part asymmetrically arranged (hereinafter "asymmetric progressive multifocal lenses") have been proposed. Their near part is slightly shifted from the center toward the nose side when a lens is being worn.

The centerline consisting of the intersection of a cross-section running through the distance center and the near center with the lens surface object side is also used as a reference line in this sort of asymmetric progressive multifocal lens. In the apparatus incorporating the principles of the present invention, this reference line is generally referred to as the "main meridian curve."

The progressive multifocal lens disclosed in Japanese Laid-Open Patent Application S62-10617, which is for both intermediate and nearby use, is central to the type of technical background described above. This progressive multifocal lens for both intermediate and near use is a progressive multifocal lens based on a design which emphasizes intermediate vision to nearby vision. Compared to progressive multifocal lenses for both distance and near vision, image swimming and distortion are minimal, and the field of vision is relatively wide from a near distance to intermediate distances. It is said that such an arrangement provides eyeglasses that are relatively easy to use, particularly indoors.

However, as the eye's accommodation ability becomes weaker it is necessary to wear lenses with larger addition. In general, the larger the addition the more noticeable the defects of the progressive multifocal lens described above. That is to say, the larger the addition, the narrower the clear vision zone at the distance part and at the near part. As a result, it is not possible to move the line of sight and have comfortable side vision in the distance part and the near part. Accordingly, it is necessary to swing the entire head to provide proper side vision. The larger the addition, the greater the lens aberration in the side zone of the progressive band linking the distance part with the near part. As a result, when the line of vision moves to the side zone of the progressive corridor, image swimming, distortion and image blurring increase. In such case the sensation of wearing eyeglasses becomes very troublesome.

Also, conventional progressive multifocal lenses are designed to permit an eyeglass wearer to try to see well from a long distance as well as a short distance regardless of the extent of weakening of the eye's accommodation ability. Thus, the progressive band is relatively long. Therefore, when a lens is inserted into the eyeglass frame, the near vision zone is positioned at the lowest portion of the frame, and the line of sight must be greatly lowered when looking at a short distance (for reading, for example). As a result, seeing is difficult and moreover the greater lowering of the line of sight causes eyestrain. Therefore it is hard to use conventional progressive multifocal lenses continuously for relatively long periods of time when doing close-up activities such as deskwork, for example.

However, the conventional progressive multifocal lens for both intermediate and near use disclosed in Japanese Laid-Open Patent Application S62-10617 has a relatively long progressive corridor so to some extent it solves defects such as image swimming and distortion which are seen in ordinary progressive multifocal lenses. Nevertheless, as described above, the progressive band is long, so to see an object at a short distance, the line of sight must be greatly lowered. Accordingly, such an arrangement has the problem that seeing at short distances is difficult and causes eyestrain.

SUMMARY OF THE INVENTION

Accordingly, it is an object of the present invention to overcome the problems associated with prior art solutions.

It is an object of the present invention to provide a progressive multifocal lens which enables people with even greatly weakened eye accommodation ability to comfortably continue to see short distances for a long period of time without eyestrain.

In a preferred embodiment of the present invention, a progressive multifocal lens is provided, which has a main meridian curve which divides the lens refracting surface into a nasal zone and a temporal zone, with a first zone for near vision correction with a surface refractive power corresponding to the near distance and a second zone for a defined vision distance correction with a surface refractive power corresponding to a defined distance spaced from the near distance. Such lens also has a progressive zone between the first zone and the second zone in which the surface refractive powers of both zones are continuously connected. A further feature of the lens is that the center of the first zone is separated from the near eyepoint by a distance of substantially 2 mm to 8 mm downward along the main meridian curve of the lens and satisfies the following condition (1):

$$0.6 < (K_E - K_A)/(K_B - K_A) < 0.9 \quad (1)$$

where:

$K_E$ is the refractive power at the near eyepoint, $K_A$ is the refractive power at the center of the second zone, and $K_B$ is the refractive power at the center of the first zone.

In accordance with another preferred embodiment of the present invention, the lens also satisfies the following conditions (2) and (3):

$$W_F \geq 50/(K_B - K_A) \quad (2)$$

$$W_N \geq 50/(K_B - K_A) \quad (3)$$

where:

$W_F$ is the maximum width in millimeters of the clear vision zone in the aforesaid second zone, and $W_N$ is the maximum width in millimeters of the clear vision zone in the aforesaid first zone.

In another preferred embodiment, the shape of the longitudinal cross-section of the refracting surface from the bottom portion to the top portion of the second zone is a noncircular shape whose longitudinal curvature value increases with distance from the point of intersection with the main meridian curve along the transverse cross-section curve; the shape of the longitudinal cross-section of the refracting surface in the top portion of the progressive zone is a noncircular shape whose longitudinal curvature value increases with distance from the point of intersection with the main meridian curve along the transverse cross-section curve; the shape of the longitudinal cross-section of the refracting surface in the bottom portion of the progressive zone is a noncircular shape whose longitudinal curvature value increases after decreasing with distance from the point of intersection with the main meridian curve along the transverse cross-section curve; and the shape of the longitudinal cross-section of the refracting surface from the top portion to the bottom portion of the first zone is a noncircular shape whose longitudinal curvature value decreases with distance from the point of intersection with the main meridian curve along the transverse cross-section curve.

According to a further preferred embodiment of the present invention, the rate of increase in the longitudinal curvature value from the bottom portion to the top portion of the second zone decreases heading from the bottom portion toward the top portion; and the position where the longitudinal curvature value in the bottom portion of the progressive zone changes from decrease to increase should be only W/3–2W/3 laterally distant from the point of intersection with the main meridian curve, where W is the radius of the progressive multifocal lens.

In still another embodiment of the present invention, the shape of the transverse cross-section of the refracting surface from the center portion to the top portion of the second zone is a noncircular shape whose transverse curvature value increases with distance from the point of intersection with the main meridian curve along the transverse cross-section curve; the shape of the transverse cross-section of the refracting surface in the bottom portion of the second zone is a noncircular shape whose transverse curvature value increases and then is essentially fixed with distance from the point of intersection with the main meridian curve along the transverse cross-section curve; in the top portion of the progressive zone there is a zone where the transverse cross-section shape of the refracting surface is an essentially circular shape; and the shape of the transverse cross-section of the refracting surface in the zone from the bottom portion of the progressive zone to the bottom portion of the first zone is a noncircular shape whose transverse curvature value increases after decreasing with distance from the point of intersection with the main meridian curve along the transverse cross-section curve.

According to yet another preferred embodiment of the present invention, the position where the transverse curvature value in the zone from the bottom portion of the progressive zone to the bottom portion of the first zone changes from decrease to increase is substantially W/2–4W/5 laterally distant from the point of intersection with the main meridian curve, where W is the radius of the progressive multifocal lens.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 3:
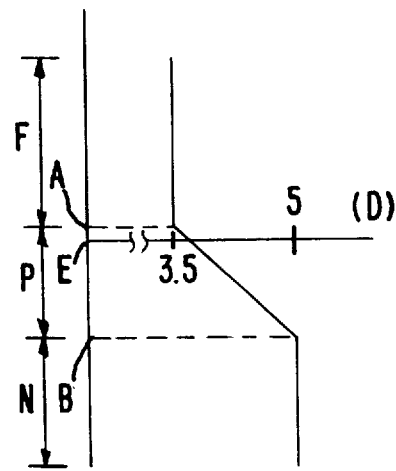
FIG. 3 is a drawing schematically explaining the refractive power distribution along the main meridian curve of a conventional progressive multifocal lens which emphasizes long-distance and short-distance vision.

Referring to the drawings, FIG. 3 is a drawing schematically explaining the refractive power distribution along the main meridian curve of a conventional progressive multifocal lens which emphasizes long-distance and short-distance vision. First, the defects of a conventional progressive multifocal lens which emphasizes long-distance and short-distance vision will be explained with reference to FIG. 3.

The progressive multifocal lens of FIG. 3 has a distance vision part F, a near vision part N, and an addition (progressive part) P. The vertical axis shows the main meridian curve of the progressive multifocal lens and the horizontal axis shows the refractive power along the main meridian curve (unit D=diopters).

As shown in FIG. 3, in a conventional progressive multifocal lens which emphasizes long-distance and short-distance vision, the distance is short along the main meridian curve from distance eyepoint E, which is the reference when wearing spectacle lenses, to distance part F's lower portion A. That is to say, under the design principles of a conventional progressive multifocal lens which emphasizes long-distance and short-distance vision, the amount of increase in refractive power at distance eyepoint E, which uses distance part F's lower portion A as reference, is about 5% of the addition. Therefore the aberration which occurs is relatively small, and excellent vision characteristics are obtained. Accordingly, the clear vision zone of distance part F can be widened to some extent. Furthermore, the distance eyepoint E is the point on the lens through which the line of sight passes when the eyeglass wearer is looking at the distance in a natural posture, and is also known as the distance fitting point.

Also, in such conventional progressive multifocal lens, the refractive power on the main meridian from distance eyepoint E to near part N's upper portion B increases only about 95% of the addition. Therefore the clear vision zone of near part N is much smaller than the clear vision zone of distance part F. Accordingly, a conventional progressive multifocal lens with the refractive power distribution shown in FIG. 3 can be used in practice as a lens for long-distance and short-distance vision or as a lens which emphasizes long-distance and intermediate vision. However, it not only has a narrow field of vision but it also has image swimming, distortion and image blurring. Therefore, it cannot be widely used in practice as a lens for intermediate and short-distance vision.

Also, in a conventional progressive multifocal lens which emphasizes distance and close-distance vision, the distance from the distance eyepoint E, which is the reference for the eyeglass frame when wearing it, to the near part N is large, so the line of sight needs to be greatly lowered when shifting to nearby vision, and this causes great eyestrain.

Therefore the progressive multifocal lens incorporating the principles of the present invention sacrifices the distance part's clear vision zone to some extent, and corrects the range to a defined distance spaced from the foreground according to the extent of the wearer's presbyopia (for mild presbyopia, the range extends to the distance realm). That is to say, the apparatus incorporating the principles of the present invention puts its greatest emphasis on the wearer's feelings when doing close-up work, and ensures the sort of long progressive band which minimizes eyeball rotational fatigue. It also ensures a near part, N, with a wide clear vision zone, and minimizes the maximum astigmatic difference. Furthermore, to some extent it ensures a clear vision zone in the intermediate portion B, and makes the defined vision distance zone adequately wide.

Furthermore, in the apparatus incorporating the principles of the present invention, the defined vision distance correction zone which has a surface refractive power corresponding to a defined distance spaced from the foreground is referred to as the defined vision part." The distance between the center of the defined vision part (the defined center) and the center of the near part (the near center) is referred to as the "progressive corridor length," and the amount of increase in refractive power added between the defined center and the near center as is referred to as the "addition."

In the apparatus incorporating the principles of the present invention, the near eyepoint is set at a distance of 2 mm to 8 mm upward along the main meridian curve from the near center. The embodiments of the present invention satisfies the following condition (1) according to the setting for the distance range from the near eyepoint to the near center:

$$0.6 < (K_E - K_A)/(K_B - K_A) < 0.9 \tag{1}$$

where:

$K_E$ is the refractive power at the near eyepoint (diopter);

$K_B$ is the refractive power at the defined center (diopter), and $K_B$ is the refractive power at the near center (diopter).

Furthermore, $(K_E - K_A)$ signifies the amount of increase in refractive power at the near eyepoint, with reference to the defined center, and $(K_B - K_A)$ signifies the amount of the increase in refractive power of the addition.

In this manner the apparatus incorporating the principles of the present invention reduces the distance from the near eyepoint, which is the reference for wearing eyeglass lenses, to the near center. Therefore, relatively little aberration occurs from the near eyepoint to the near part, and excellent vision characteristics can be obtained. Also, it is possible to shift from intermediate vision to nearby vision without the wearer greatly lowering the line of sight. In this manner, a wide clear vision range can be ensured in the near part.

When the amount of increase in refractive power ($K_E - K_A$) at the near eyepoint, with reference to the defined center, is set to 60% through 90% of addition ($K_B$–$K_A$), as is done in the apparatus incorporating the principles of the present invention, the concentration of astigmatic difference in the side zone of the zone extending from the near eyepoint to the near part is reduced. Accordingly, image swimming, distortion, image blurring and so forth are suppressed, and a wide clear vision area can be achieved in the near part as well as in the intermediate part.

Additionally, with the embodiments of the present invention, the refractive power is lowered to just 60% to 90% of addition from the near eyepoint across the defined vision part. Because of this structure, vision characteristics from the near eyepoint across the defined vision part are improved, and aberration concentration in the side zones of the main meridian curve is alleviated. As a result, image swimming, distortion and image blurring are reduced, and a wide clear vision zone can be ensured. The extent of variation in refractive power from the near eyepoint across the defined vision part is relatively small, so it is possible to have a structure in which the connection between the near eyepoint and the defined vision part is continuous and smooth. Therefore it is possible to obtain an intermediate vision configuration with relatively little image jumping or distortion, and a large clear vision zone can be ensured in the defined vision part.

However, if the distance from the near eyepoint to the near center is less than 2 mm for all of the embodiments of the present invention, refractive power on the main meridian curve from the near eyepoint to the defined center is greatly reduced. As a result, the extent of variation in refractive power from the near eyepoint to the defined center becomes large, and it is not possible to obtain an excellent intermediate vision configuration with little image swimming, distortion and image blurring. Additionally, an adequately wide clear vision zone cannot be ensured in the defined vision part.

If the distance from the near eyepoint to the near center is less than 2 mm, the distance from the near eyepoint to the defined vision part becomes too long, resulting in the feeling of the eyeglass wearer of being too high when in the defined vision distance state.

On the other hand, for all of the embodiments, if the distance from the near eyepoint to the near center is more than 8 mm, it is not possible to shift to the near vision zone without the wearer greatly lowering the line of sight. As a result, eyestrain occurs and it becomes impossible to ensure a wide enough clear vision zone in the near part.

In the embodiments of the present invention, it is preferred that the following condition (2) and (3) be satisfied:

$$W_F \geq 50/(K_B-K_A) \quad (2)$$

$$W_N \geq 50/(K_B-K_A) \quad (3)$$

where:

$W_F$ is the maximum width in millimeters of the clear vision zone in defined vision part; and $W_N$ is the maximum width in millimeters of the clear vision zone in the near part.

If conditions (2) and (3) are not satisfied, an adequately wide clear vision zone in the defined vision part and the near part cannot be ensured.

Figure 6:
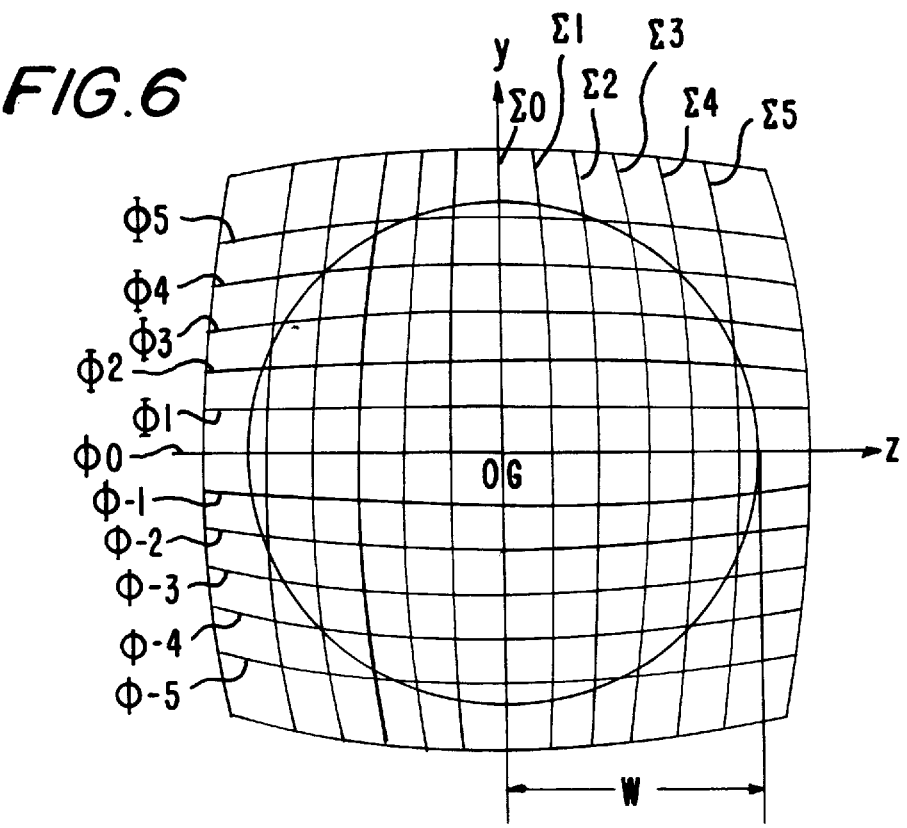
FIG. 6 is a drawing explaining the horizontal cross-section and vertical cross-section for the first embodiment and the transverse and longitudinal cross-section, respectively, for both the second and third embodiments used as reference for designing the progressive multifocal lens constructed in accordance with the principles of the present invention.

When designing the lens surface for this type of progressive multifocal lens, it is necessary that more than just the range of round shapes for the lens be considered in the design evaluation. Referring to FIG. 6, the sort of quadrilateral shape shown therein is assumed, which includes a round-shaped lens surface, and the surface shape within this quadrilateral shape is evaluated. By optimizing the curved surface in a surface large enough to contain a round-shaped lens, it is possible to give the actual lens surface a smoother and superior shape.

Furthermore, for the first embodiment, in FIG. 6 OG is the geometric center of the lens, and W is the lens radius. The curves Φ5–Φ–5 and Σ0–Σ5 indicate the horizontal cross-section and vertical cross-section, respectively which are the references for designing along the z-axis and y-axis.

In general, progressive multifocal lenses are processed to fit an eyeglass frame, so the distance part, intermediate part, and near part—particularly the zone of the distance part and the near part, including the peripheral part—differ according to the frame shape. Before processing, a progressive multifocal lens is usually a round lens whose diameter is about 60 mm or greater, and it is provided to optical shops in this round shape. In the shop, it is processed to fit the shape of a desired eyeglass frame.

Therefore, when regulating the surface shape of a progressive multifocal lens according to the apparatus incorporating the principles of the present invention, the standard is the round preprocessing shape. When designing the optimum surface shape for a progressive multifocal lens, it is necessary to consider not just the surface shape for the often used center zone but also a wider zone which includes the used effective zones and to try to balance aberration.

The first embodiment of the present invention will be explained based on the attached drawings. Before explaining a specific embodiment, the method of designing the progressive multifocal lens of this embodiment will be explained as well as the various points which are references for a progressive multifocal lens.

Figure 4:
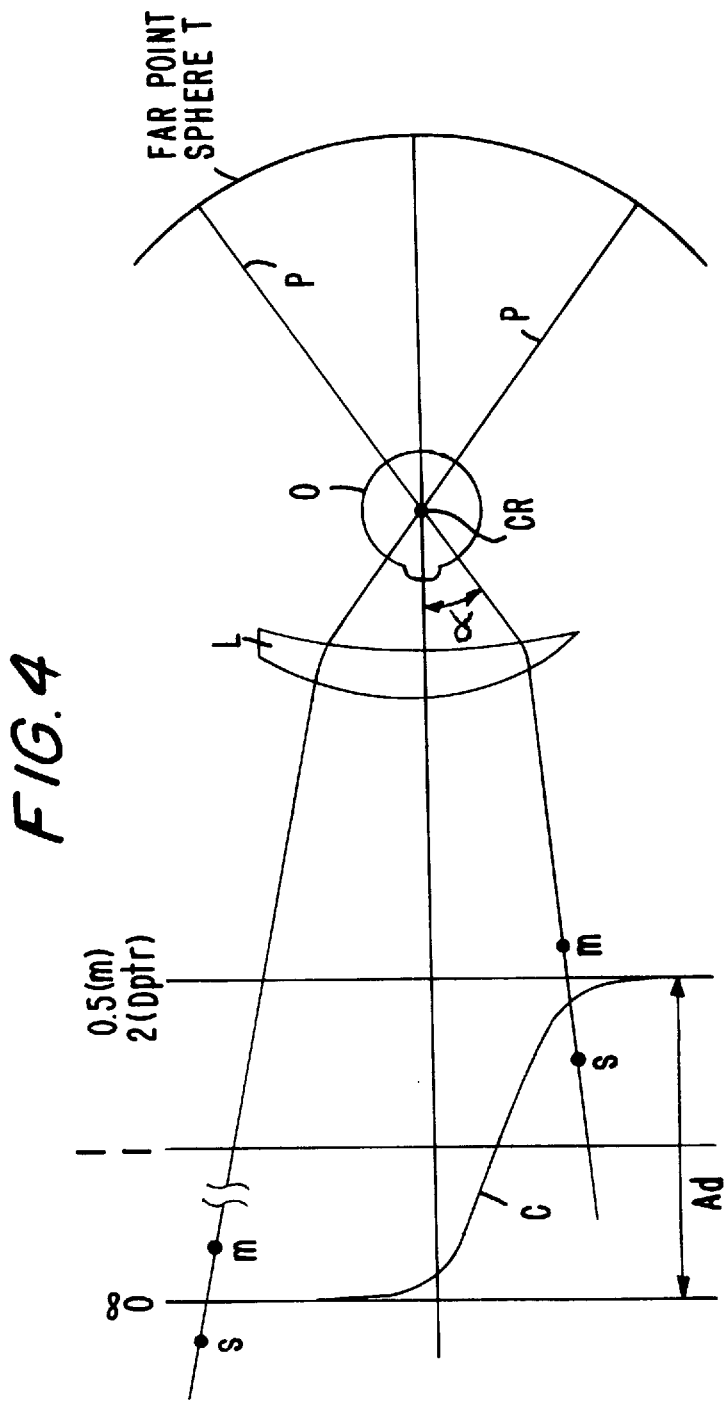
FIG. 4 is a drawing schematically explaining the general state of the eye when wearing a progressive multifocal lens by showing a cross-section along the main meridian, i.e., the lens' vertical cross-section.

FIG. 4 is a drawing schematically explaining the general state of the eye of a wearer when wearing a progressive multifocal lens. FIG. 4 shows a cross-section along the main meridian curve, i.e. the lens' vertical cross-section. As shown in the drawing, eyeball O rotates about an eyeball rotation centerpoint CR, so the line of sight P passes through various points on lens L. If the head tilts downward when looking at a nearby object, the line of sight simultaneously descends by only an angle α. If progressive multifocal lenses are worn while this occurs, the line of sight of both eyes shifts from the intermediate part to the near part along the main meridian curve in lens L while converging. In the retina, the unit which provides vision, the most acute visual power resides in the macular central cavity, and when trying to see an object the eye is tilted toward the object so that the line of sight matches the position of the central cavity. A distinct image must be formed at this central cavity position. If accommodation does not occur, the object side conjugate position of this central cavity position is called the accommodation far point, and the track T of this accommodation far point when the eyeball rotates and moves is called the far point sphere.

When the eye is in a farsighted state as shown in FIG. 4, the accommodation far point of the farsighted eye draws a far point sphere T located behind the eye and centered on rotation point CR. Therefore this is equivalent to the macular central cavity being at this far point sphere T position.

Consider a light ray P from this far point sphere T, which passes through the rotation point CR and heads toward the progressive multifocal lens L. This light ray P is refracted by lens L, and the focus position is the object position. At this time an excellent imaging state occurs if the position of the image m (the meridional image) in the direction along the main meridian curve and the position of the image s (the sagittal image) along the direction perpendicular to the main meridian curve coincide. Nevertheless, as shown in the drawing, image m and image s do not coincide, leading to the creation of an astigmatic difference. If the extent of this astigmatic difference is severe, the object appears to be flowing and causes unpleasant vision phenomena such as image distortion, etc.

The curve c of FIG. 4 shows variation in the conjugate point with far point sphere T. It is a curve connecting the average positions of image m and image s. This curve corresponds to the so-called addition curve of progressive multifocal lens L. In the case of FIG. 4, the refractive power of the near part is 2 diopters (D) when the refractive power at the distance part is 0 diopters The addition Ad is called 2 diopters. The distance between the image m and the image s corresponds to the astigmatic difference of aberration when the spectacle lens L is being worn.

By evaluating lens performance in this way, when a progressive multifocal lens is actually being worn, it becomes possible to design a progressive multifocal lens which can achieve the best performance when it is ultimately being used.

However, the center of the defined vision part-that is, the defined center-is a position on the main meridian curve in the defined vision part which has a predetermined average surface refractive power. In practice this is the point which is the measurement reference point for the defined vision part. The center of the near part—that is, the near center—is a position on the main meridian curve in the near part which has a predetermined average surface refractive power. In practice this is the point which is the measurement reference point for the near part.

The near eyepoint is a position used for reference when inserting a lens into an eyeglass frame. When the eyeglass frame is being worn, it is the near reference point which agrees with the near line of sight transit position. In the first embodiment of the present invention the position of the near eyepoint and the lens geometric center coincide, but it is not absolutely necessary that they do so.

Figure 1:
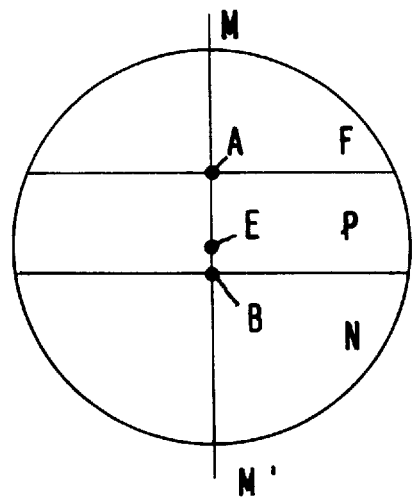
FIG. 1 is a drawing explaining an overview of the zone categories in a progressive multifocal lens according to the embodiments of the present invention.

FIG. 1 is a drawing explaining an overview of the zone categories in a progressive multifocal lens according to the first embodiment of the present invention.

As shown in FIG. 1, this embodiment of a progressive multifocal lens is provided with defined vision part F located in the upper portion when the lens is worn, near part N in the lower portion, and intermediate part P whose refractive power changes continuously between these two zones. For the shape of the lens surface, the intersection of a cross-section along a meridian running vertically through nearly the center of the lens surface from the upper portion to the lower portion with the object side lens surface—that is, the main meridian curve MM'—is used as a reference line for expressing the specifications of lens addition, etc. In a progressive multifocal lens that is symmetrically designed in this manner, defined center A, near eyepoint E, and near center B are on the main meridian curve MM'.

In this way the progressive multifocal lens of FIG. 1 is provided, along a main meridian curve MM', with a first or near part N that has a surface refractive power corresponding to the foreground, a second or defined vision part F that has a surface refractive power corresponding to a defined distance spaced from the foreground, and an intermediate part P between the near part N and the defined vision part F in which the surface refractive powers of both zones are continuously connected. The zone upward from the defined center A can be considered defined vision part F, the zone downward from the near center B can be considered near part N, and the zone between the defined center A and the near center B can be considered intermediate part P. Refractive power changes continuously at the refracting surface of the progressive multifocal lens, and it is not possible to clearly distinguish each zone, but when considering lens structure the zone categories such as in FIG. 1 are generally used as an effective means.

Figure 2:
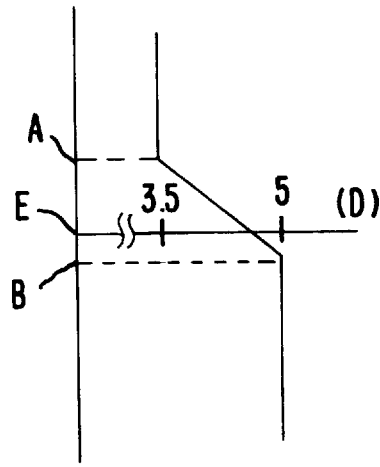
FIG. 2 is a drawing schematically explaining the refractive power distribution along the main meridian curve of the progressive multifocal lens embodying the present invention.

FIG. 2 is a drawing schematically explaining the refractive power distribution along the main meridian curve of the progressive multifocal lens embodying the principles of the present invention. In FIG. 2, as in FIG. 3, the vertical axis shows the main meridian curve of the progressive multifocal lens and the horizontal axis shows the refractive power along the main meridian curve (unit D=diopters).

As shown in FIG. 2, the average value of surface refractive power on the main meridian curve is structured so that it is connected continuously and smoothly from the defined center A through the near eyepoint E to the near center B.

In the progressive multifocal lens embodying the principles of the present invention, the distance from the near eyepoint E to the near center B along the main meridian curve is 5 mm, and the distance from the near eyepoint E to the defined center A along the main meridian curve is 14 mm. Therefore the distance from the defined center A to the near center B along the main meridian curve—that is, the length of the progressive band—is 19 mm.

Also referring to FIG. 2, in the progressive multifocal lens embodying the principles of the present invention, the average value of refractive power of defined vision part F (base curve) is 3.5 diopters, and addition Ad is 1.5 diopters. Therefore, as shown in the drawing, the refractive power at the defined center A is 3.5 diopters, and the refractive power at the near center B is 5.0 diopters.

Figure 5:
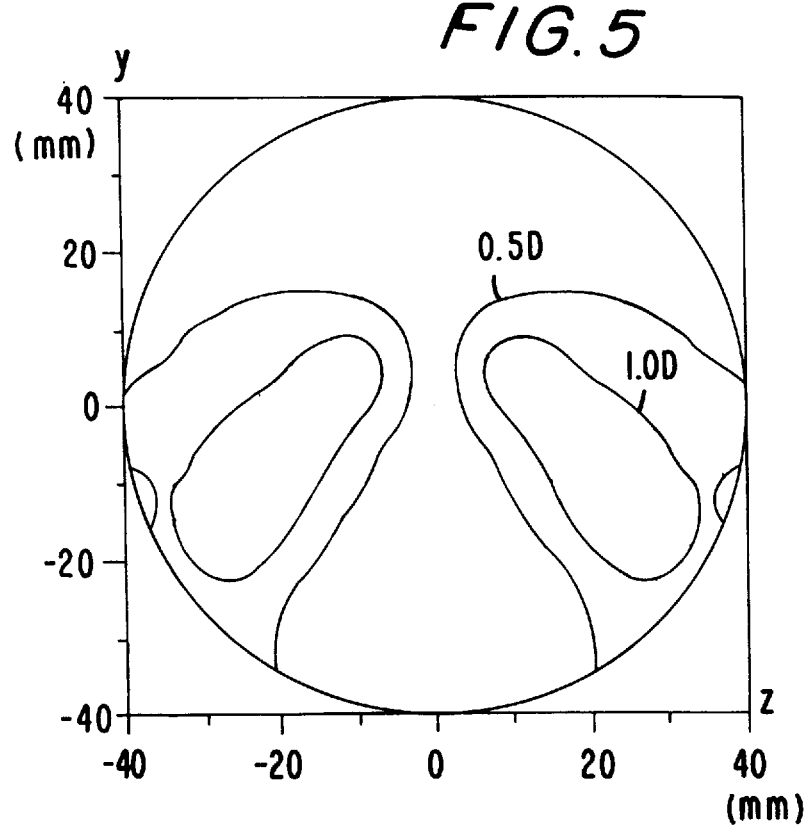
FIG. 5 is an equal astigmatic difference curve drawing for the progressive multifocal lens embodying the present invention for Embodiments 1 through 3.

FIG. 5 is an equal astigmatic difference curve drawing for this embodiment's progressive multifocal lens. It shows the results of performance evaluation according to the design method shown in FIG. 4 of a lens being worn. In FIG. 5 the equal astigmatic difference curve is shown at intervals of 0.5 diopters.

Referring to FIG. 5, in this embodiment of a progressive multifocal lens, the maximum value for astigmatic difference is about 1.0 (diopters), and we see that it is possible to have excellent intermediate vision and close-distance vision with little image swimming, distortion and image blurring. The moderate refractive power gradient from the defined center A to the near eyepoint E reduces both the density and gradient of the lines showing equal astigmatic difference in the side zones from the lower part of the defined vision part F across the intermediate part P.

In this embodiment, in order to make intermediate vision and close-distance vision easy, the distance along the main meridian curve from the near eyepoint E, which is used as a reference in wearing spectacle lenses, and the near center B is set at a short 5 mm. Therefore, when viewing in front of the head, the refractive power of the lens matches the intermediate vision and a bit to the near side of intermediate vision, and it is easy to handle intermediate vision and a bit to the near side of the intermediate vision. As shown in FIG. 5, relatively little aberration occurs from the near eyepoint E to the near part N, and excellent vision characteristics can be obtained. The clear vision zone of near part N can be somewhat wide.

In this embodiment the amount of increase in the refractive power at near eyepoint E, using defined center A as a reference, is set at about 75% of addition Ad (1.5 diopters). That is, the difference in refractive power at near center B and refractive power at near eyepoint E is about 0.35 diopters. As a result, the concentration of astigmatic difference in the side zone of the zone extending from the near center B to nearly the center of the intermediate zone P is reduced, and image swimming, distortion and blurring, etc. are suppressed. As shown in FIG. 5, a wide clear vision zone can be achieved in near part N and intermediate part P.

Additionally, in this embodiment the distance from the near eyepoint E, which is used as a reference in wearing spectacle lenses, to the near center B is set at a short 5 mm, so it is possible to shift from the intermediate vision zone to the near vision zone without greatly lowering the line of sight. As shown in FIG. 5, the maximum width $W_N$ of the clear vision zone in the near part N is about 40 mm, and an adequately wide clear vision zone can be ensured in near part N compared to conventional progressive multifocal lenses. As noted above, the average value of refraction of addition Ad is 1.5 diopters, so the maximum width $W_N$ of the clear vision zone in near part N satisfies the above-noted condition (3).

In this embodiment the refractive power along the main meridian curve from near eyepoint E to defined center A decreases to about 75% of addition Ad. That is, the difference in refractive power at near eyepoint E and refractive power at defined center A is about 1.15 diopters. This structure provides improved vision characteristics from near eyepoint E to defined vision part F, and aberration concentration in the side zones of the main meridian curve is alleviated. As a result, image swimming, distortion and blurring can be reduced and a wide clear vision zone can be ensured.

The extent of variation in refractive power from near eyepoint E to defined center A (1.15 diopters/14 mm=0.082) is relatively small, so it is possible to have a structure in which the connection between near eyepoint E and defined vision part F is continuous and smooth. Therefore it is possible to obtain an intermediate vision state with relatively little image swimming, distortion and blurring. Additionally, as shown in FIG. 5, the maximum width $W_F$ of the clear vision zone in the defined vision part F is about 60 mm, and an adequately wide clear vision zone can be ensured in defined vision part F compared to conventional progressive multifocal lenses. As indicated above, the average value of refraction of addition Ad is 1.5 diopters, so the maximum width $W_F$ of the clear vision zone in defined vision part F satisfies the above-noted condition (2).

Furthermore, in this embodiment the distance from the near eyepoint E to the near center B is set at 5 mm, but substantially the same effect can be obtained with the distance set from 2 mm to 8 mm. However, if the distance from the near eyepoint E to the near center B is shorter than 2 mm, the refractive power on the main meridian curve from the near eyepoint E to the defined center A is reduced to about 95% of addition Ad. As a result the extent of variation in refractive power from the near eyepoint E to the defined vision part F becomes large, and it is not possible to obtain an excellent intermediate vision state with little image swimming, distortion and blurring. Additionally, it will not be possible to ensure an adequately wide clear vision zone in the defined vision part F.

If the distance from the near eyepoint E to the near center B is less than 2 mm, the distance from the near eyepoint E to the defined vision part F becomes too long, resulting in the wearer feeling of being too high when in the defined vision distance state.

On the other hand, if the distance from the near eyepoint E to the near center B is more than 8 mm, it is not possible to shift to the near vision zone without greatly lowering the line of sight. As a result, eyestrain occurs and it becomes impossible to ensure a wide enough clear vision zone in the near part N.

Furthermore, the above relates only to the tendencies of surface refractive power along the main meridian curve. It is difficult to completely explain the tendencies of surface refractive power in the peripheral parts. Nevertheless, by distributing refractive power along the main meridian curve as described above it is possible to maintain an excellent aberration balance across the entire lens surface, and it is possible to achieve a progressive multifocal lens which emphasizes intermediate and close-distance vision and has superior vision characteristics.

Before explaining further specific embodiments of the present invention, the transverse cross-section and the longitudinal cross-section as used in the present invention will be explained.

Figure 7:
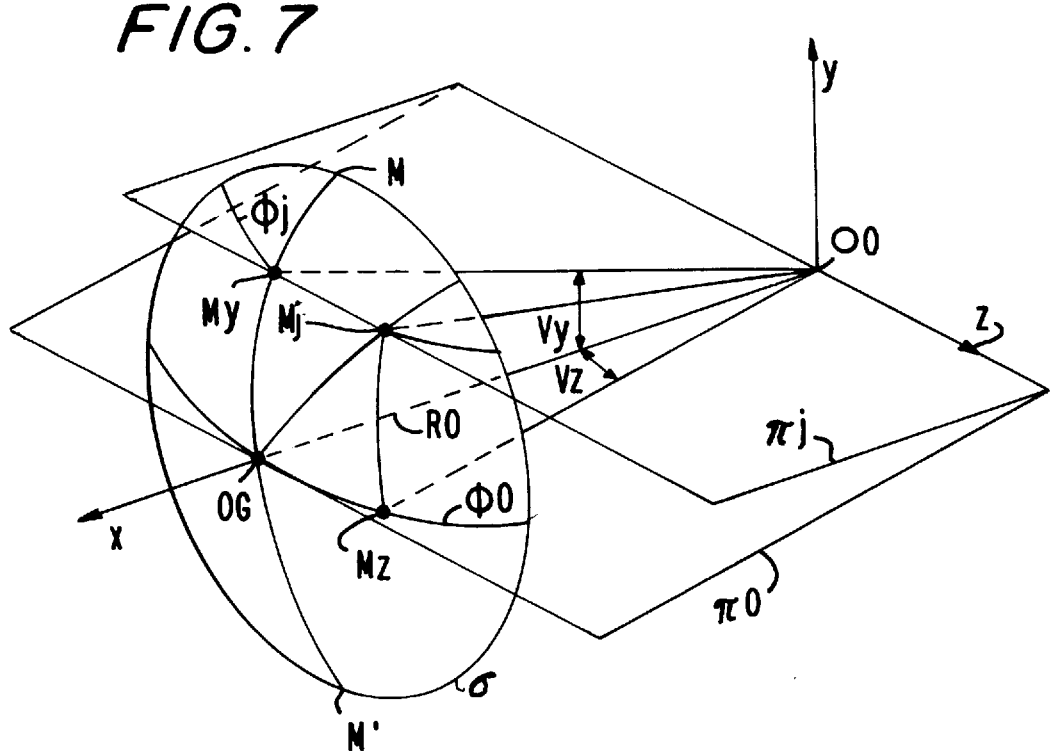
FIG. 7 is an oblique view schematically explaining the transverse cross-section curve of the lens refracting surface s.
Figure 8:
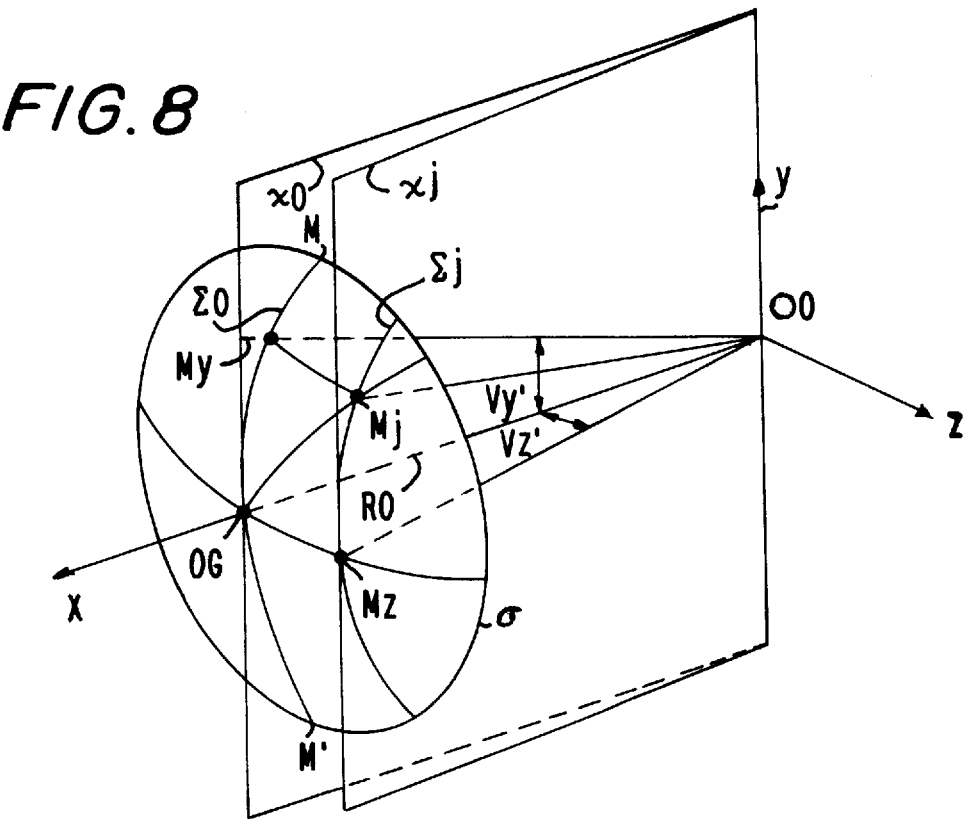
FIG. 8 is an oblique view schematically explaining the longitudinal cross-section curve of the lens refracting surface s.

FIG. 7 is an oblique view explaining the transverse cross-section curve of lens refracting surface, σ. FIG. 8 is an oblique view explaining the longitudinal cross-section curve of lens refracting surface, σ. In FIG. 7 and FIG. 8 the geometric center of the lens is OG, the center of curvature of refracting surface σ at geometric center OG is O0, and the axis passing through geometric center OG and center of curvature O0 is the x-axis. A sphere whose radius is the radius of curvature R0 of refracting surface σ at geometric center OG is a reference sphere. Therefore the reference sphere touches the lens refracting surface σ at geometric center OG. The reference sphere center O0 is the zero point, the vertical direction is the y-axis, and the horizontal direction is the z-axis.

As shown in FIG. 7, a "transverse cross-section curve" in the apparatus incorporating the principles of the present invention is a transverse line of refracting surface a traversed by plane πj (j=0, ±1, ±2 . . . ) perpendicular to plane xy and passing through the reference sphere center O0 described above. In other words, a "transverse cross-section curve" in the apparatus incorporating the principles of the present invention is the line of intersection between plane πj and refracting surface σ. In FIG. 7, this is expressed as transverse cross-section line of intersection Φj (j=0, ±1, ±2 . . . ). Furthermore, in this embodiment the lens section traversed by plane πj and including a transverse cross-section curve is called a "transverse cross-section."

In FIG. 7 the point of intersection between the plane πj which includes point Mj on the refracting surface and the line of intersection of plane xy and refracting surface σ is called My. The angle created with the x-axis by the segment linking point of intersection My and center of curvature O0 is called Vy. The point on transverse cross-section line of intersection Φ0 which has the same z coordinate component as point Mj on the refracting surface is called Mz, and the angle created with the x-axis by the segment linking the point of intersection Mz and the center of curvature O0 is called Vz.

As shown in FIG. 8, a "longitudinal cross-section curve" in the apparatus incorporating the principles of the present invention is a longitudinal section line of refracting surface σ longitudinally cut by plane xj (j=0, ±1, ±2 . . . ) perpendicular to plane yz and passing through the reference sphere center O0 described above. In other words, a "longitudinal cross-section curve" in this embodiment of the present invention is the intersection line between plane xj and refracting surface σ, and in the drawing is expressed as longitudinal cross-section line of intersection Σj (j=0, ±1, ±2 . . . ). Furthermore, the lens section longitudinally cut by plane xj and including a longitudinal cross-section curve is called a "longitudinal cross-section."

In FIG. 8 the point of intersection between the plane xj which includes point Mj on the refracting surface and the line of intersection of plane xz and refracting surface σ is called Mz. The angle created with the x-axis by the segment linking point of intersection Mz and center of curvature O0 is called Vz'. The point on transverse cross-section line of intersection Σ0 which has the same y coordinate component as point Mj on the refracting surface is called My, and the angle created with the x-axis by the segment linking point My and center of curvature O0 is called Vy'.

The FIG. 6 drawing shows the positions of transverse cross-section lines of intersection Φj projected at FIG. 7's yz plane and longitudinal cross-section lines of intersection Σj projected at FIG. 8's yz plane. It is a drawing showing the planar positions of transverse cross-section lines of intersection Φj and longitudinal cross-section lines of intersection Σj on the lens' refracting surface.

Figure 9:
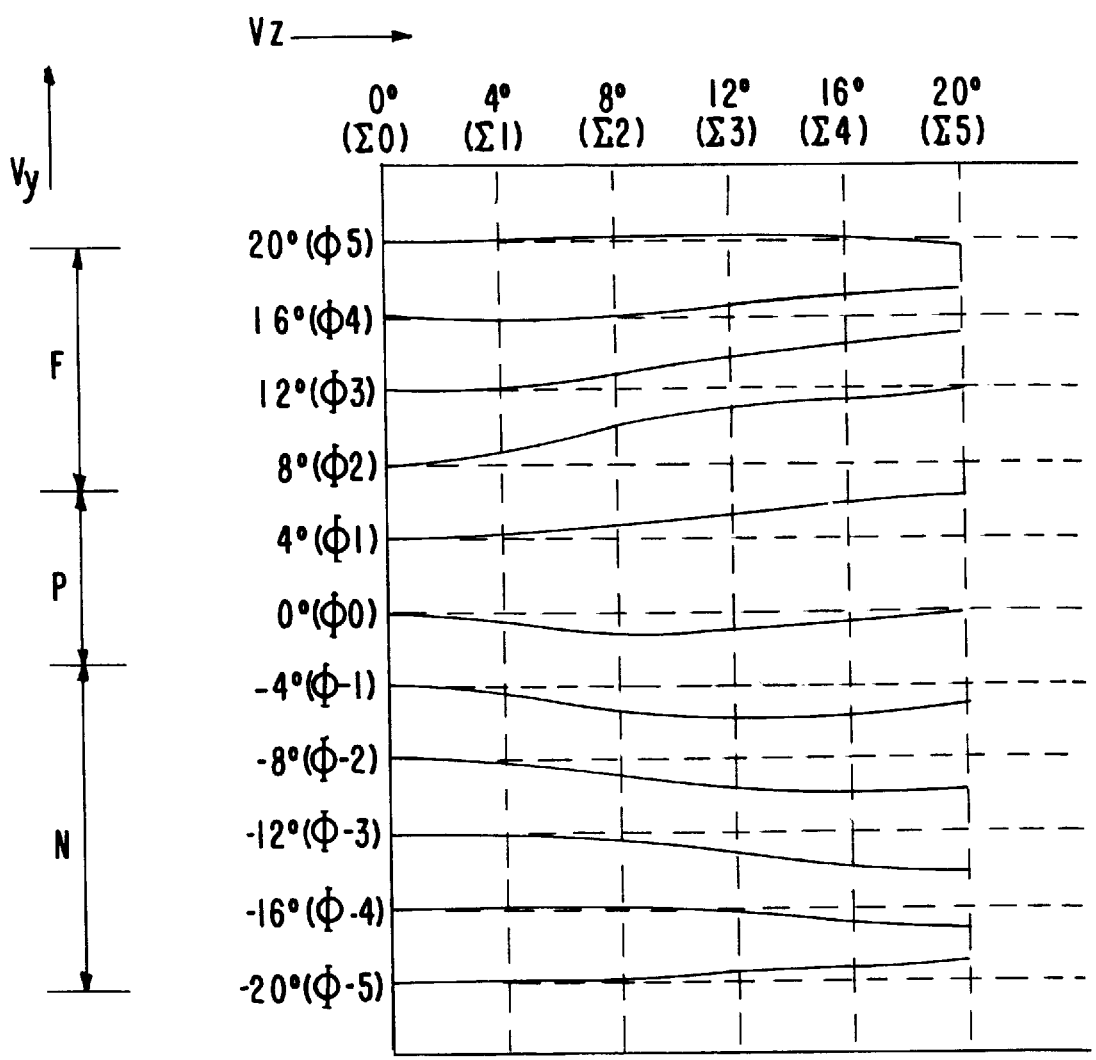
FIG. 9 is a drawing showing the variation in curvature of the refracting surface of a progressive multifocal lens according to a second embodiment of the present invention. It shows variation in curvature in the longitudinal direction on refracting surface s along the transverse cross-section lines of intersection Φ5 to Φ–5 shown in FIG. 6.

FIG. 9 is a drawing showing variation in curvature of the refracting surface of a progressive multifocal lens according to a second embodiment of the present invention. It is a drawing which shows variation in longitudinal curvature of refracting surface σ along the transverse cross-section lines of intersection Φ5–Φ–5 shown in FIG. 6. In this embodiment of the present invention, curvature in the longitudinal direction (along longitudinal cross-section curves) of the refracting surface is called "longitudinal curvature."

In FIG. 9 the vertical axis is angle Vy from FIG. 7, and the horizontal axis is angle Vz from FIG. 7.

That is, FIG. 9 plots variation in longitudinal curvature along eleven typical transverse cross-section curves Φ5–Φ–5 that intersect main meridian curve MM' of FIG. 7. In even more detail, this drawing shows the variation in longitudinal curvature at each position in a range where angle Vz varies from 0° to +20° at 4° intervals on transverse cross-section lines Σ0–Σ5 in a range where angle Vy varies from +20° to –20° at intervals of 4° as the variation in longitudinal curvature at the points of intersection between each transverse cross-section curve and main meridian curve MM'. That is, in FIG. 9 the vertical axis and the horizontal axis show angles Vy and Vz respectively. When the variation in longitudinal curvature at a point increases relative to the reference longitudinal curvature the curve goes upward, and when it decreases the line goes downward.

As shown in FIG. 9, in this second embodiment's progressive multifocal lens the shape of the longitudinal cross-section of the refracting surface from the bottom portion to the top portion (Vy in the range 8° to 16°) of the defined vision part F is a noncircular shape whose longitudinal curvature value increases with distance from the point of intersection with the main meridian curve MM' along the transverse cross-section curve. This rate of increase decreases heading from the bottom portion toward the top portion. The longitudinal cross-section of the refracting surface in the highest portion (Vy=20°) of the defined vision part F is a noncircular shape whose longitudinal curvature value decreases after increasing with distance from the point of intersection with the main meridian curve MM'. If the lens shape is considered to be circular, the longitudinal cross-section shape of the side part does not contribute to optical performance.

Meanwhile, the shape of the longitudinal cross-section of the refracting surface in the top portion of the intermediate part P (Vy=4°) is a noncircular shape whose longitudinal curvature value increases with distance from the point of intersection with the main meridian curve MM' along the transverse cross-section curve. The shape of the longitudinal cross-section of the refracting surface in the bottom portion of the intermediate part P (Vy=0°) is a noncircular shape whose longitudinal curvature value increases after decreasing with distance from the point of intersection with the main meridian curve MM' along the transverse cross-section curve. Furthermore, in the bottom portion of the intermediate part P (Vy=0°) the position where the longitudinal curvature value changes from decrease to increase in practice should be only W/3–2W/3 distant from the main meridian curve along the transverse cross-section curve, where W is the radius of the progressive multifocal lens.

The shape of the longitudinal cross-section of the refracting surface from the top portion to the bottom portion (Vy in the range –4° to –16°) of the near part N is a noncircular shape whose longitudinal curvature value decreases monotonically with distance from the point of intersection with the main meridian curve MM' along the transverse cross-section curve. The rate of decrease decreases heading from the top portion toward the bottom portion. The shape of the longitudinal cross-section of the refracting surface at the lowest portion (Vy=–20°) of the near part N is a noncircular shape whose longitudinal curvature value increases with distance from the point of intersection with the main meridian curve MM' along the transverse cross-section curve, but if the lens shape is considered to be circular, the longitudinal cross-section shape of the side part does not contribute to optical performance.

When varying the longitudinal curvature along the transverse cross-section curves as described above, the curvature in the side zones from the bottom portion to the top portion of the defined vision part F increases an average of about 16% relative to the reference curvature at the point of intersection between the transverse cross-section and the main meridian curve. The curvature in the side zones in the top portion of the intermediate part P increases about 12% relative to the reference curvature at the point of intersection between the transverse cross-section and the main meridian curve.

The longitudinal curvature value from the bottom portion (Vy=0°) of the intermediate part P to the top portion (Vy= –8°) of the near part N increases after decreasing, and at its lowest value decreases an average of about 8% relative to the reference curvature at the point of intersection between the transverse cross-section and the main meridian curve. Additionally, the curvature in the side zones at the center of the near part N decreases about 11% relative to the reference curvature at the point of intersection between the transverse cross-section and the main meridian curve.

Figure 10:
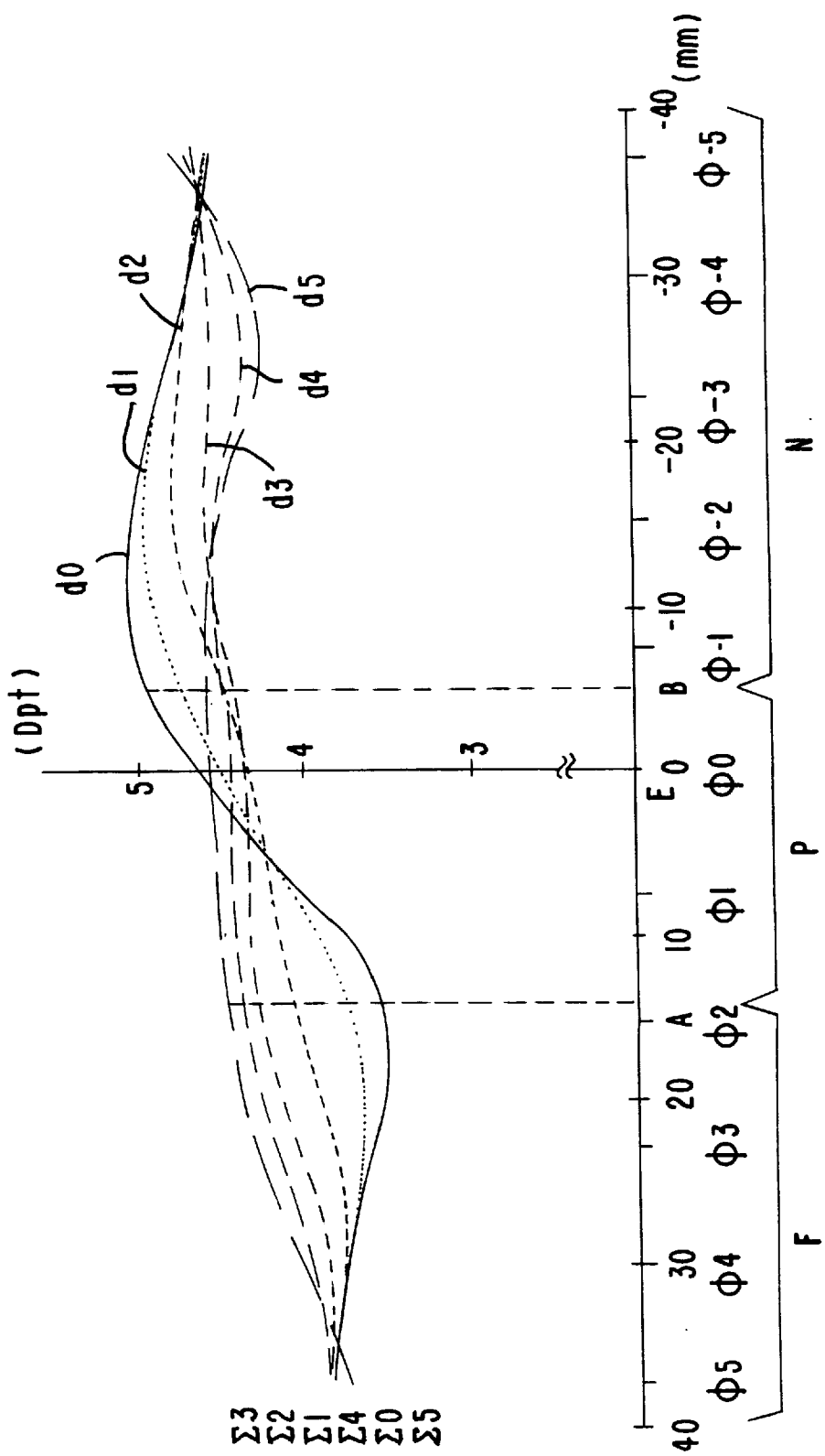
FIG. 10 is a drawing showing variation, along longitudinal cross-section lines of intersection, in refractive power in the longitudinal direction corresponding to longitudinal curvature of the progressive multifocal lens of the second embodiment.

FIG. 10 is a drawing showing variation, along longitudinal cross-section lines of intersection, in longitudinal refractive power corresponding to longitudinal curvature in this embodiment's progressive multifocal lens. That is, FIG. 10 is a drawing which plots longitudinal refractive power on refracting surface σ along FIG. 8's longitudinal cross-section lines of intersection Σj. It shows longitudinal variation in longitudinal curvature on refracting surface σ. These curves are also the addition curves along the various longitudinal cross-section lines of intersection (Σj).

The radius of curvature and refractive power are closely related. If R is radius of curvature and n is the lens index of refraction, curvature r can be expressed by the following Equation (a):

$$r = 1/R \tag{a}$$

Refractive power D can be expressed by the following Equation (b):

$$D = (n-1)/R = (n-1)r \tag{b}$$

Then if radius of curvature R is converted to metric units, refractive power D can be expressed in diopter units.

In FIG. 10 longitudinal cross-section line of intersection Σ0 is equivalent to the main meridian curve MM' (Vz'=0°) of FIG. 8, and the variation in refractive power in the longitudinal direction along this main meridian curve MM' is shown as curve d0. Longitudinal cross-section lines of intersection Σ1, Σ2, Σ3, Σ4, and Σ5 correspond to Vz'=4°, 8°, 12°, 16°, and 20°, respectively. The variation in refractive power in the longitudinal direction along each longitudinal cross-section line of intersection is shown as curve d1, d2, d3, d4, and d5. Here, if Vz'=20° nearly corresponds to the maximum effective radius W of a progressive multifocal lens, then the positions of Σ1, Σ2, Σ3, Σ4, and Σ5 correspond to the positions W/5, 2W/5, 3W/5, 4W/5, and W, respectively.

As shown in FIG. 10, in the highest portion of the lens—that is, from the top portion of defined vision part F (excluding the highest portion of defined vision part F) to the top portion of intermediate part P—refractive power (d5) at the lens' edge portion (Σ5) is larger than the refractive power (d0) at the main meridian curve. From the top portion of defined vision part F to the top portion of intermediate part P the curves d1, d2, d3, and d4 fall between curves d0 and d5. The refractive power increases with distance in the lateral direction from the main meridian curve.

In the lowest portion of the lens—that is, from the bottom of intermediate part P to the near part N (excluding the lowest portion of near part N)—the greatest refracting power is at the main meridian curve (d0) and for a specific addition it has a tendency to decrease in the top portion of the near part N after increasing.

As also shown in FIG. 10, in the zone from the center of intermediate part P to near part N, surface refractive power C in the longitudinal direction in the zones laterally distanced from the main meridian curve falls in the range of Ad/2+K (=4.24 diopters) to Ad+K (=5 diopters) relative to surface refractive power K (3.5 diopters) at defined center A and addition Ad (1.5 diopters).

Figure 11:
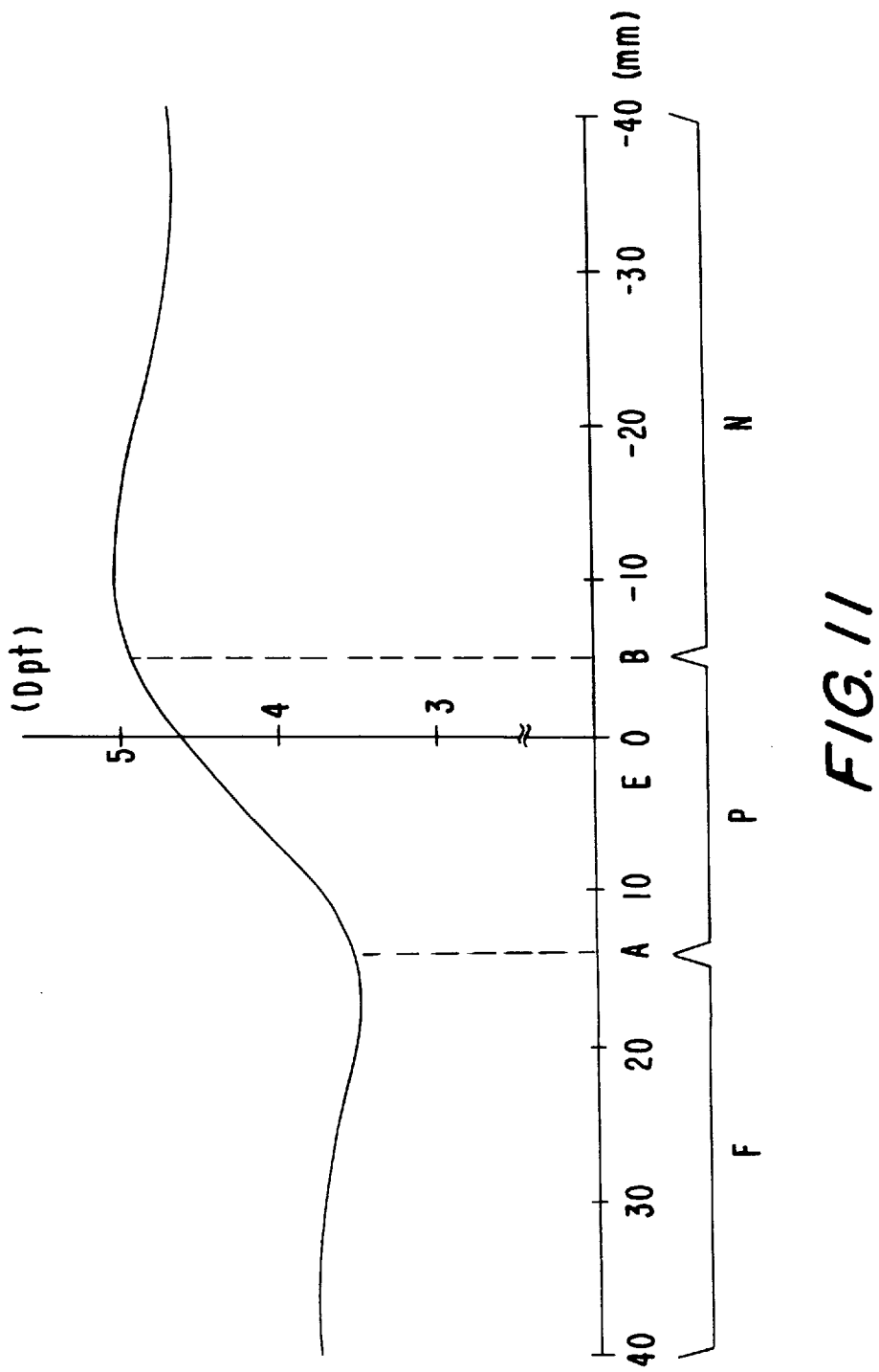
FIG. 11 is a drawing showing the distribution of average refractive power along the main meridian curve in the progressive multifocal lens of the second and the third embodiments.

FIG. 11 is a drawing showing distribution of average refractive power along the main meridian curve of this embodiment's progressive multifocal lens.

As described above, this embodiment's progressive multifocal lens has a defined vision part F with an average refractive power (base curve) of 3.5 diopters, and its addition Ad is 1.5 diopters. Therefore, as shown in FIG. 11, the average refractive power at defined center A is nearly 3.5 diopters, and the average refractive power at near center B is 5.0 diopters.

In this second embodiment, the longitudinal cross-section shape contributes to the advantageous features illustrated and discussed with respect to FIG. 5.

In this second embodiment of the present invention, also, by setting the distance from the near eyepoint E to the near center B at a short 5 mm and by regulating the longitudinal cross-section shape of the refractive surface, relatively little aberration occurs from the near eyepoint E to the near part N, excellent vision characteristics can be obtained, and the clear vision zone of near part N can be somewhat wide, as shown in FIG. 5.

Also, in this embodiment the concentration of astigmatic difference in the side zone of the zone extending from the top portion of the near part N to nearly the center of the intermediate part P is reduced, and image jumping and distortion, etc. are suppressed. As shown in FIG. 5 a wide clear vision zone can be achieved in near part N and intermediate part P.

Additionally, in this second embodiment by setting the distance from the near eyepoint E to the near center B at a short 5 mm and by regulating the longitudinal cross-section shape of the refractive surface according to the present invention, it is possible to shift from the intermediate vision zone to the near vision zone without greatly lowering the line of sight. Additionally, as noted above and as shown in FIG. 5, the maximum width $W_N$ of the clear vision zone in the near part N is about 40 mm, and an adequately wide clear vision zone can be ensured in near part N compared to conventional progressive multifocal lenses.

Further, in this second embodiment, regulating the longitudinal cross-section shape of the refractive surface according to the present invention from the near eyepoint E to the defined vision part F provides improved vision characteristics from the near eyepoint E to the defined vision part F, and aberration concentration in the side zones of the main meridian curve is alleviated. As a result, image swimming, distortion and blurring can be reduced and a wide clear vision zone can be ensured. Additionally, as shown in FIG. 5, the maximum width $W_F$ of the clear vision zone in the defined vision part F is about 60 mm, and an adequately wide clear vision zone can be ensured in defined vision part F compared to conventional progressive multifocal lenses.

Also, in this second embodiment the distance from the near eyepoint E to the near center B is set at 5 mm, but the same effect can be obtained with the distance set from 2 mm to 8 mm by regulating the longitudinal cross-section shape of the refractive surface according to the present invention. However, if the distance from the near eyepoint E to the near center B is shorter than 2 mm, the refractive power on the main meridian curve from the near eyepoint E to the defined center A is reduced to about 95% of addition Ad. As a result the extent of variation in refractive power from the near eyepoint E to the defined vision part F becomes large, and it is not possible to obtain an excellent intermediate vision state with little image swimming, distortion and blurring. Additionally, it will not be possible to ensure an adequately wide clear vision zone in the defined vision part F.

If the distance from the near eyepoint E to the near center B is less than 2 mm, the distance from the near eyepoint E to the defined vision part F becomes too long, resulting in the feeling of being too high when in the defined vision distance state.

On the other hand, if the distance from the near eyepoint E to the near center B is more than 8 mm, it is not possible to shift to the near vision zone without greatly lowering the line of sight. As a result, eyestrain occurs and it becomes impossible to ensure a wide enough clear vision zone in the near part N.

By regulating the longitudinal cross-section shape of the refractive surface according to the second embodiment of the present invention, as described above, it is possible to maintain an excellent aberration balance across the entire lens surface, and it is possible to achieve a progressive multifocal lens which emphasizes intermediate and close-distance vision and has superior vision characteristics.

Figure 12:
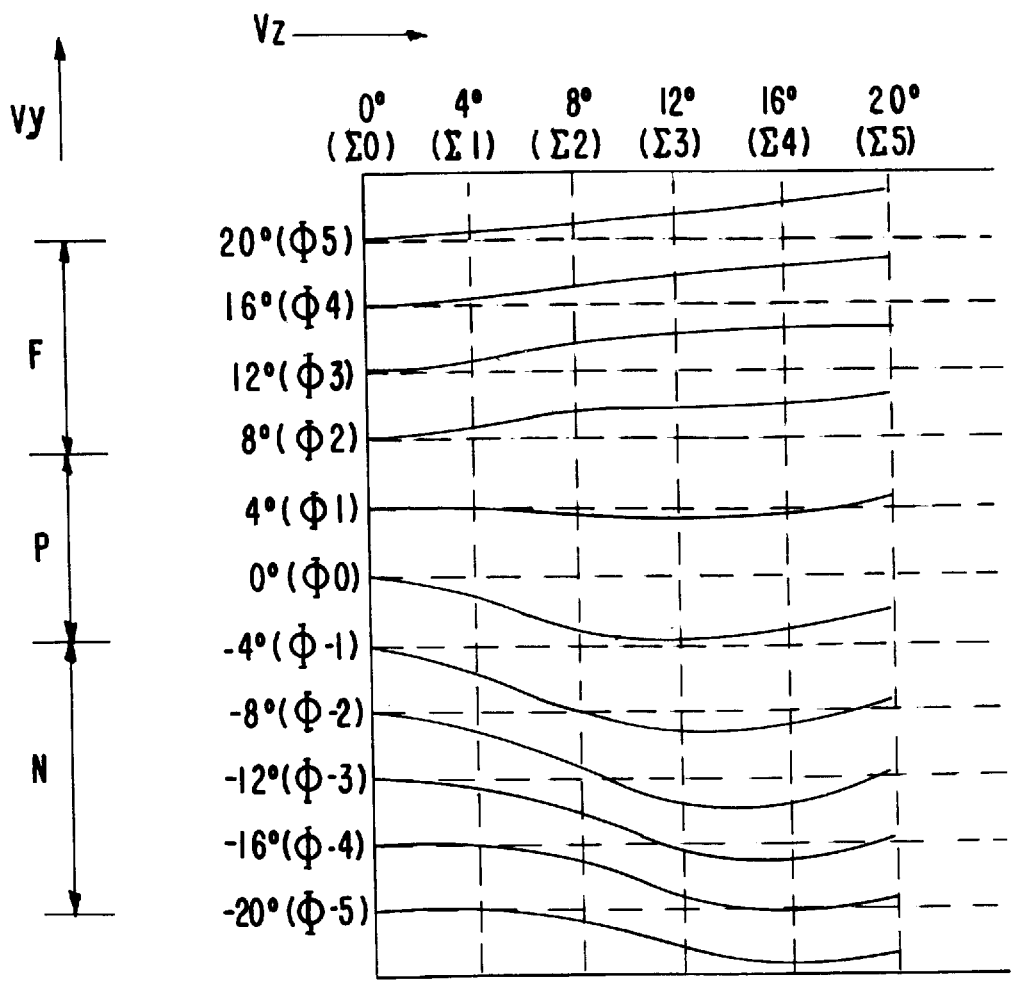
FIG. 12 is a drawing showing variation in curvature of the refracting surface of a progressive multifocal lens according to a third embodiment of the present invention. It shows variation in curvature in the transverse direction on refracting surface s along the transverse cross-section lines of intersection Φ5 to Φ–5 shown in FIG. 6.

Referring now to FIG. 12, the third embodiment of the present invention will be explained.

FIG. 12 is a drawing showing variation in curvature of the refracting surface of a progressive multifocal lens according to the third embodiment of the present invention. It is a drawing which shows variation in transverse curvature of refracting surface a along the transverse cross-section lines of intersection Φ5–Φ–5 shown in FIG. 6. In this embodiment, curvature in the transverse direction (along transverse cross-section curves) of the refracting surface is called "transverse curvature."

That is, FIG. 12 plots variation in transverse curvature along eleven typical transverse cross-section curves that intersect main meridian curve MM' of FIG. 7. In even more detail, this drawing shows the variation in transverse curvature at each position in a range where angle Vz of FIG. 7 varies from 0° to +20° at 4° intervals on transverse cross-section lines in a range where angle Vy varies from +20° to −20° at intervals of 4° as the variation in transverse curvature at the points of intersection between each transverse cross-section curve and main meridian curve MM'. That is, in FIG. 12 the vertical axis and the horizontal axis show angles Vy and Vz respectively; when the variation in transverse curvature at a point increases relative to the reference transverse curvature the curve goes upward, and when it decreases the line goes downward.

As shown in FIG. 12, in this third embodiment's progressive multifocal lens the shape of the transverse cross-section of the refracting surface from the center portion to the top portion (Vy in the range 12° to 20°) of the defined vision part F is a noncircular shape whose transverse curvature value increases with distance from the point of intersection with the main meridian curve MM' along the transverse cross-section curve. The transverse cross-section of the refracting surface in the bottom portion (Vy=8°) of the defined vision part F is a noncircular shape whose transverse curvature value increases and then is essentially fixed with distance from the point of intersection with the main meridian curve MM'.

Meanwhile, in the top portion (Vy=4°) of the intermediate part P of FIG. 12 there is a zone where the transverse cross-section shape of the refracting surface is an essentially circular shape (the curvature value in the transverse direction along the transverse cross-section curve is essentially constant). The shape of the transverse cross-section of the refracting surface in the bottom portion (Vy=0°) of the intermediate part P is a noncircular shape whose transverse curvature value increases after decreasing with distance from the point of intersection with the main meridian curve along the transverse cross-section curve.

Then the shape of the transverse cross-section of the refracting surface from the top portion to the bottom portion (Vy in the range −4° to −20°) of the near part N is a noncircular shape whose transverse curvature value increases after decreasing with distance from the point of intersection with the main meridian curve MM' along the transverse cross-section curve. The rate of decrease and the rate of increase decreases heading from the top portion toward the bottom portion.

Furthermore, the position where the transverse curvature value in the zone from the bottom portion of the intermediate part P to the bottom portion of the near part N (Vy in the range 0° to −20°) changes from decrease to increase should be in practice only W/2–4W/5 from the main meridian curve along the transverse cross-section curve, where W is the radius of the progressive multifocal lens.

When varying the transverse curvature along the transverse cross-section curves as described above, the curvature in the side zones from the center portion to the top portion part of the defined vision part F increases an average of about 18% relative to the reference curvature at the point of intersection between the transverse cross-section and the main meridian curve. The transverse curvature value in the bottom portion of the defined vision part F increases and then is essentially fixed, but curvature at the side zones increases an average of about 15% relative to the reference curvature at the point of intersection between the transverse cross-section and the main meridian curve. Additionally, the transverse curvature value in the bottom portion of the intermediate part P decreases and then increases, but its minimum value decreases about 17% relative to the reference curvature at the point of intersection between the transverse cross-section and the main meridian curve. The transverse curvature value in the zone from the top portion to the bottom portion of the near part N decreases and then increases, but its minimum value decreases an average of about 28% relative to the reference curvature at the point of intersection between the transverse cross-section and the main meridian curve.

Figure 13:
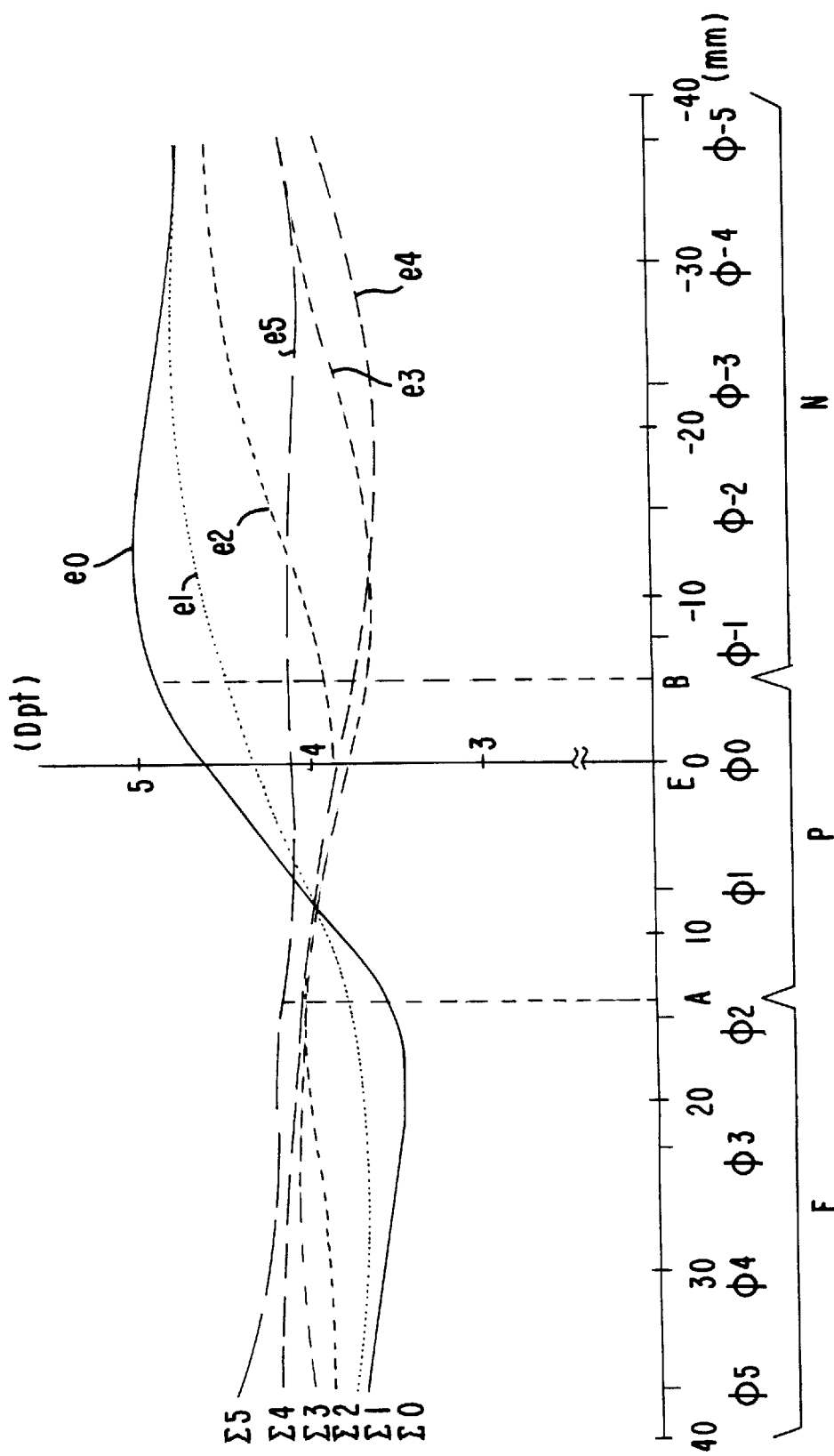
FIG. 13 is a drawing showing variation, along longitudinal cross-section lines of intersection, in refractive power in the transverse direction corresponding to transverse curvature of the third embodiment's progressive multifocal lens.

FIG. 13 is a drawing showing variation, along longitudinal cross-section lines of intersection, in transverse refractive power corresponding to transverse curvature in the third embodiment's progressive multifocal lens. That is, FIG. 13 is a drawing which plots transverse direction refractive power on refracting surface σ along FIG. 8's longitudinal cross-section lines of intersection Σj. It shows longitudinal variation in transverse curvature on refracting surface σ. These curves are also the addition curves along the various longitudinal cross-section lines of intersection (Σj).

In FIG. 13 longitudinal cross-section line of intersection Σ0 is equivalent to main meridian curve MM' (Vz'=0°), and the variation in refractive power in the transverse direction along this main meridian curve MM' is shown as curve e0. Longitudinal cross-section lines of intersection Σ1, Σ2, Σ3, Σ4, and Σ5 correspond to Vz'=4°, 8°, 12°, 16°, and 20° respectively, and the variation in refractive power in the transverse direction along each longitudinal cross-section line of intersection is shown, respectively, as curve e1, e2, e3, e4, and e5. Here, if Vz'=20° nearly corresponds to the maximum effective diameter (radius) W of a progressive multifocal lens, then the positions of Σ1, Σ2, Σ3, Σ4, and Σ5 correspond to the positions W/5, 2W/5, 3W/5, 4W/5, and W.

As shown in FIG. 13, from the top portion of defined vision part F to the top portion of intermediate part P, refractive power (e5) at the lens' edge portion (Σ5) is larger than the refractive power (e0) at the main meridian curve. From the top portion of defined vision part F to the top portion of intermediate part P the curves e1, e2, e3, and e4 fall between curves e0 and e5. It can be seen that refractive power increases with distance in the lateral direction from the main meridian curve. At a point in the top portion of the intermediate part P these refractive powers become essentially equal to one another.

Meanwhile, in the bottom portion of the intermediate part P the largest refracting power is at the main meridian curve (e0), and the refracting power at the position laterally distanced from the main meridian curve by just W/5 is the next largest (e1). The refracting powers at the positions laterally distanced from the main meridian curve by just 2W/5, 3W/5, and 4W/5 (e2, e3, and e4) are smaller than refracting power (e5) at the lens edge part (Σ5).

In the near part N, the largest refracting power is at the main meridian curve (e0), and for a specific addition it has a tendency to decrease in the top portion of the near zone N after increasing. In the side zones of near part N the refracting power at the positions laterally distanced from the main meridian curve by just 3W/5 and 4W/5 (e3 and e4) decreases temporarily heading from the top portion toward the bottom portion of the near part N and then increases, but is smaller than other refracting powers. Because of this, refracting power (e5) at the lens edge portion (Σ5) fluctuates somewhat, but refracting power is essentially identical across the whole of the near part N.

As also shown in FIG. 13, in the zone from the center of intermediate part P to near part N, surface refractive power C in the transverse direction in the zones laterally distanced from the main meridian curve falls in the range of K (=3.5 diopters) to Ad+K (=5 diopters) relative to surface refractive power K (3.5 diopters) at defined center A and addition Ad (1.5 diopters).

As noted above, FIG. 11 also shows the distribution of average refractive power along the main meridian curve of the third embodiment's progressive multifocal lens.

As described above, the third embodiment's progressive multifocal lens has a defined vision part F with an average refractive power (base curve) of 3.5 diopters, and its addition Ad is 1.5 diopters. Therefore, as shown in FIG. 11, the average refractive power at defined center A is nearly 3.5 diopters, and the average refractive power at near center B is 5.0 diopters.

In the third embodiment, the transverse cross-section shape contributes to the advantageous features illustrated and discussed with respect to FIG. 5.

In the third embodiment, by setting the distance from the near eyepoint E to the near center B at a short 5 mm and by regulating the transverse cross-section shape of the refractive surface, relatively little aberration occurs from the near eyepoint E to the near part N, excellent vision characteristics can be obtained, and the clear vision zone of near part N can be somewhat wide, as shown in FIG. 5.

Also, in this third embodiment, the concentration of astigmatic difference in the side zone of the zone extending from the top portion of the near part N to nearly the center of the intermediate part P is reduced, and image swimming, distortion and blurring, etc. are suppressed. As shown in FIG. 5 a wide clear vision zone can be achieved in near part N and intermediate part P.

Additionally, in this third embodiment by setting the distance from the near eyepoint E to the near center B at a short 5 mm and by regulating the transverse cross-section shape of the refractive surface according to the present invention, it is possible to shift from the intermediate vision zone to the near vision zone without greatly lowering the line of sight. Additionally, as shown in FIG. 5, the maximum width $W_N$ of the clear vision zone in the near part N is about 40 mm, and an adequately wide clear vision zone can be ensured in near part N compared to conventional progressive multifocal lenses.

Further, in this third embodiment, regulating the transverse cross-section shape of the refractive surface according to the present invention from the near eyepoint E to the defined vision part F provides improved vision characteristics from the near eyepoint E to the defined vision part F, and aberration concentration in the side zones of the main meridian curve is alleviated. As a result, image swimming, distortion and blurring can be reduced and a wide clear vision zone can be ensured. Additionally, as shown in FIG. 5, the maximum width $W_F$ of the clear vision zone in the defined vision part F is about 60 mm, and an adequately wide clear vision zone can be ensured in defined vision part F compared to conventional progressive multifocal lenses.

In this third embodiment the distance from the near eyepoint E to the near center B is set at 5 mm, but the same effect can be obtained with the distance set from 2 mm to 8 mm by regulating the transverse cross-section shape of the refractive surface according to the present invention. However, if the distance from the near eyepoint E to the near center B is shorter than 2 mm, the refractive power on the main meridian curve from the near eyepoint E to the defined center A is reduced to about 95% of addition Ad. As a result the extent of variation in refractive power from the near eyepoint E to the defined vision part F becomes large, and it is not possible to obtain a excellent intermediate vision state with little image swimming, distortion and blurring. Additionally, it will not be possible to ensure an adequately wide clear vision zone in the defined vision part F.

If the distance from the near eyepoint E to the near center B is less than 2 mm, the distance from the near eyepoint E to the defined vision part F becomes too long, resulting in the feeling of being too high when in the defined vision distance state.

On the other hand, if the distance from the near eyepoint E to the near center B is more than 8 mm, it is not possible to shift to the near vision zone without greatly lowering the line of sight. As a result, eyestrain occurs and it becomes impossible to ensure a wide enough clear vision zone in the near part N.

By regulating the transverse cross-section shape of the refractive surface according to the third embodiment of the present invention as described above it is possible to maintain an excellent aberration balance across the entire lens surface, and it is possible to achieve a progressive multifocal lens which emphasizes intermediate and nearby vision and has superior vision characteristics.

In all of the embodiments, the present invention is used in a progressive multifocal lens that uses the main meridian curve as reference and is symmetrical to the left and right, but the present invention can also be used in an asymmetric progressive multifocal lens with the near part biased to the nose side.

As explained above, the present invention enables implementation of a progressive multifocal lens which enables even people whose eye accommodation ability is greatly weakened to comfortably continue to see at close distances for a long period of time.

Various modifications will become possible for those skilled in the art after receiving the teachings of the present disclosure without departing from the scope thereof.

What is claimed is:

1. A progressive multifocal lens comprising:
    a lens refracting surface divided along a main meridian curve into a nasal zone and a temporal zone; said surface having:
        a first zone for near vision correction with a surface refractive power corresponding to the near distance;
        a second zone for defined vision distance correction with a surface refractive power corresponding to a defined distance spaced from said near distance; and
        a progressive zone between said first and second zones in which the surface refractive powers of both said first and second zones are continuously connected, wherein the center of said first zone is separated from the near eyepoint by a distance of 2 mm to 8 mm downward along said main meridian curve, and wherein the following condition is satisfied:

$$0.6 < (K_E - K_A)/(K_B - K_A) < 0.9$$

where:
    $K_E$ is the refractive power at said near eyepoint;
    $K_A$ is the refractive power at the center of said second zone; and
    $K_B$ is the refractive power at the center of said first zone.

2. The progressive multifocal lens as claimed in claim 1, wherein said near eyepoint is located near the center of the lens geometry.

3. The progressive multifocal lens, as claimed in claim 1, wherein said first and second zones each have a clear vision zone and said following conditions are also satisfied:

$W_F \geq 50/(K_B-K_A)$ $W_N \geq 50/(K_B-K_A)$ where:
$W_F$ is the maximum width of said clear vision zone in said second zone; and
$W_N$ is the maximum width of said clear vision zone in said first zone.

4. A progressive multifocal lens comprising:
a lens refracting surface divided along a main meridian curve into a nasal zone and a temporal zone;
said surface having:
a first zone for near vision correction with a surface refractive power corresponding to the near distance;
a second zone for defined vision distance correction with a surface refractive power corresponding to a defined distance spaced from said near distance; and
a progressive zone between said first and second zones in which the surface refractive powers of both said first and second zones are continuously connected, wherein the center of said first zone is separated from the near eyepoint by a distance of 2 mm to 8 mm downward along said main meridian curve;
whereby the shape of the longitudinal cross-section of the refracting surface from the bottom portion to the top portion of said second zone is a noncircular shape whose longitudinal curvature value increases with distance from the point of intersection with said main meridian curve along the transverse cross-section curve;
the shape of the longitudinal cross-section of the refracting surface in the top portion of said progressive zone is a noncircular shape whose longitudinal curvature value increases with distance from the point of intersection with said main meridian curve along the transverse cross-section curve;
the shape of the longitudinal cross-section of the refracting surface in the bottom portion of said progressive zone is a noncircular shape whose longitudinal curvature value increases after decreasing with distance from the point of intersection with said main meridian curve along the transverse cross-section curve; and
the shape of the longitudinal cross-section of the refracting surface from the top portion to the bottom portion of said first zone is a noncircular shape whose longitudinal curvature value decreases with distance from the point of intersection with said main meridian curve along the transverse cross-section curve.

5. The progressive multifocal lens as claimed in claim 4, wherein said near eyepoint is located near the center of the lens geometry.

6. The progressive multifocal lens, as claimed in claim 4, wherein the rate of increase in the longitudinal curvature value from the bottom portion to the top portion of said second zone decreases heading from the bottom portion toward the top portion.

7. The progressive multifocal lens, as claimed in claim 4, wherein the position where the longitudinal curvature value in the bottom portion of said progressive zone changes from decrease to increase is substantially W/3–2W/3 laterally distant from the point of intersection with said main meridian curve, where W is the radius of said progressive multifocal lens.

8. The progressive multifocal lens, as claimed in claim 6, wherein the position where the longitudinal curvature value in the bottom portion of said progressive zone changes from decrease to increase is substantially W/3–2W/3 laterally distant from the point of intersection with said main meridian curve, where W is the radius of said progressive multifocal lens.

9. The progressive multifocal lens, as claimed in claim 4, wherein the rate of decrease in the longitudinal curvature value from the top portion to the bottom portion of said first zone decreases heading from the top portion toward the bottom portion.

10. The progressive multifocal lens, as claimed in claim 6, wherein the rate of decrease in the longitudinal curvature value from the top portion to the bottom portion of said first zone decreases heading from the top portion toward the bottom portion.

11. The progressive multifocal lens, as claimed in claim 7, wherein the rate of decrease in the longitudinal curvature value from the top portion to the bottom portion of said first zone decreases heading from the top portion toward the bottom portion.

12. The progressive multifocal lens, as claimed in claim 8, wherein the rate of decrease in the longitudinal curvature value from the top portion to the bottom portion of said first zone decreases heading from the top portion toward the bottom portion.

13. The progressive multifocal lens, as claimed in claim 4, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
K is the surface refractive power at the center of said second zone; and
Ad is addition.

14. The progressive multifocal lens, as claimed in claim 6, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
K is the surface refractive power at the center of said second zone; and
Ad is addition.

15. The progressive multifocal lens, as claimed in claim 7, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
K is the surface refractive power at the center of said second zone; and
Ad is addition.

16. The progressive multifocal lens, as claimed in claim 8, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
    K is the surface refractive power at the center of said second zone; and
    Ad is addition.

17. The progressive multifocal lens, as claimed in claim 9, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
    K is the surface refractive power at the center of said second zone; and
    Ad is addition.

18. The progressive multifocal lens, as claimed in claim 10, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
    K is the surface refractive power at the center of said second zone; and
    Ad is addition.

19. The progressive multifocal lens, as claimed in claim 11, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
    K is the surface refractive power at the center of said second zone; and
    Ad is addition.

20. The progressive multifocal lens, as claimed in claim 12, wherein the longitudinal surface refractive power C in the zone laterally distanced from said main meridian curve in the zone from the center of said progressive zone to said first zone satisfies the condition:

$$(Ad/2+K)<C<(Ad+K)$$

where:
    K is the surface refractive power at the center of said second zone; and
    Ad is addition.

21. A progressive multifocal lens comprising:
    a lens refracting surface divided along a main meridian curve into a nasal zone and a temporal zone;
    said surface having:
        a first zone for near vision correction with a surface refractive power corresponding to the near distance;
        a second zone for defined vision distance correction with a surface refractive power corresponding to a defined distance spaced from said near distance; and
        a progressive zone between said first and second zones in which the surface refractive powers of both said first and second zones are continuously connected, wherein the center of said first zone is separated from the near eyepoint by a distance of 2 mm to 8 mm downward along said main meridian curve;
    whereby the shape of the transverse cross-section of the refracting surface from the center portion to the top portion of said second zone is a noncircular shape whose transverse curvature value increases with distance from the point of intersection with said main meridian curve along the transverse cross-section curve;
    the shape of the transverse cross-section of the refracting surface in the bottom portion of said second zone is a noncircular shape whose transverse curvature value increases and then is essentially fixed with distance from the point of intersection with said main meridian curve along the transverse cross-section curve;
    in the top portion of said progressive zone there is a zone where the transverse cross-section shape of the refracting surface is an essentially circular shape; and
    the shape of the transverse cross-section of the refracting surface in the zone from the bottom portion of said progressive zone to the bottom portion of said first zone is a noncircular shape whose transverse curvature value increases after decreasing with distance from the point of intersection with said main meridian curve along the transverse cross-section curve.

22. The progressive multifocal lens as claimed in claim 21, wherein said near eyepoint is located near the center of the lens geometry.

23. The progressive multifocal lens, as claimed in claim 21, wherein the position where the transverse curvature value in the zone from the bottom portion of said progressive zone to the bottom portion of said first zone changes from decrease to increase is substantially W/2–4W/5 laterally distant from the point of intersection with said main meridian curve, where W is the radius of said progressive multifocal lens.

24. The progressive multifocal lens, as claimed in claim 21, wherein the rate of decrease and the rate of increase in transverse curvature from the top portion to the bottom portion of said first zone decreases heading from the top portion toward the bottom portion.

25. The progressive multifocal lens, as claimed in claim 23, wherein the rate of decrease and the rate of increase in transverse curvature from the top portion to the bottom portion of said first zone decreases heading from the top portion toward the bottom portion.

26. The progressive multifocal lens, as claimed in claim 21, wherein the transverse surface refractive power C in the zone laterally distanced from said main meridian curve in the zone from the center of said progressive zone to said first zone satisfies the condition:

$$K<C<(Ad+K)$$

where:
    K is the surface refractive power at the center of said second zone; and
    Ad is addition.

27. The progressive multifocal lens, as claimed in claim 23, wherein the transverse surface refractive power C in the zone laterally distanced from said main meridian curve in the zone from the center of said progressive zone to said first zone satisfies the condition:

$$K<C<(Ad+K)$$

where:

K is the surface refractive power at the center of said second zone; and

Ad is addition.

28. The progressive multifocal lens, as claimed in claim 24, wherein the transverse surface refractive power C in the zone laterally distanced from said main meridian curve in the zone from the center of said progressive zone to said first zone satisfies the condition:

$$K<C<(Ad+K)$$

where:

K is the surface refractive power at the center of said second zone; and

Ad is addition.

29. The progressive multifocal lens, as claimed in claim 25, wherein the transverse surface refractive power C in the zone laterally distanced from said main meridian curve in the zone from the center of said progressive zone to said first zone satisfies the condition:

$$K<C<(Ad+K)$$

where:

K is the surface refractive power at the center of said second zone; and

Ad is addition.

* * * * *